(12) United States Patent
Hu et al.

(10) Patent No.: US 9,088,341 B2
(45) Date of Patent: Jul. 21, 2015

(54) SOFTWARE DEFINED RADIO DEVICE AND CONFIGURATION METHOD OF THE SAME

(75) Inventors: Liangliang Hu, Shanghai (CN); Yanmeng Sun, Shanghai (CN)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 1336 days.

(21) Appl. No.: 12/226,647

(22) PCT Filed: Apr. 19, 2007
(Under 37 CFR 1.47)

(86) PCT No.: PCT/IB2007/051407
§ 371 (c)(1),
(2), (4) Date: Jan. 8, 2010

(87) PCT Pub. No.: WO2007/125459
PCT Pub. Date: Nov. 8, 2007

(65) Prior Publication Data
US 2011/0039503 A1 Feb. 17, 2011

(30) Foreign Application Priority Data
Apr. 28, 2006 (CN) .......................... 2006 1 0077447

(51) Int. Cl.
*H04B 1/40* (2006.01)
*H04B 1/403* (2015.01)
*H04B 1/00* (2006.01)

(52) U.S. Cl.
CPC .............. *H04B 1/406* (2013.01); *H04B 1/0003* (2013.01)

(58) Field of Classification Search
CPC ............ H04B 1/406; H04B 1/44; H04B 1/54; H04B 1/0458; H04B 1/40; H04B 1/005; H04B 1/006; H04W 48/18

USPC ............ 455/552.1, 558, 70, 410, 432.1, 436, 455/418, 424, 425, 435.1, 435.2, 553, 411, 455/77, 74, 553.1
See application file for complete search history.

(56) References Cited

U.S. PATENT DOCUMENTS 5,999,990 A * 12/1999 Sharrit et al. ...................... 710/8
6,954,634 B1 * 10/2005 Bucknell et al. ............... 455/418
(Continued)

FOREIGN PATENT DOCUMENTS

| EP | 1 515 448 A1 | 3/2005 | |
|----|----|----|----|
| WO | WO 01/90890 A1 | 11/2001 | |
| WO | WO 0190890 | * 11/2001 | ............... G06F 9/445 |

OTHER PUBLICATIONS

Notification Concerning Transmittal of International Preliminary Report on Patentability (Chapter 1 of the Patent Cooperation Treaty) dated Apr. 28, 2006 in connection with PCT Application No. PCT/IB2007/051407.

(Continued)

*Primary Examiner* — Wesley Kim
*Assistant Examiner* — Md Talukder
(74) *Attorney, Agent, or Firm* — Leffler Intellectual Property Law, PLLC

(57) ABSTRACT

The invention discloses a SDR (software defined radio) device and its configuration method. The SDR device has at least one memory for storing a plurality of configurable generic software modules to be configured based on pre-defined configuration parameters, so that the plurality of configurable generic software modules are adapted to a communication standard corresponding to the configuration parameters; and a plurality of generic hardware modules, for performing instructions in the plurality of configured generic software modules, to accomplish a corresponding function, so as to make the software defined radio device as a communication device complying with the communication standard.

4 Claims, 4 Drawing Sheets

(56) References Cited

U.S. PATENT DOCUMENTS

| | | | |
|---|---|---|---|
| 7,404,074 B2* | 7/2008 | Murotake | 713/100 |
| 7,573,398 B2* | 8/2009 | Hoctor et al. | 340/870.12 |
| 7,784,028 B2* | 8/2010 | Luo et al. | 717/120 |
| 8,800,015 B2* | 8/2014 | Christopher et al. | 726/7 |
| 2002/0126705 A1* | 9/2002 | Gentieu et al. | 370/503 |
| 2003/0050055 A1* | 3/2003 | Ting et al. | 455/419 |
| 2004/0005910 A1* | 1/2004 | Tom | 455/558 |
| 2005/0059427 A1* | 3/2005 | Wallace | 455/552.1 |
| 2005/0066156 A1 | 3/2005 | Moy et al. | |
| 2005/0181875 A1* | 8/2005 | Hoehne et al. | 463/41 |
| 2005/0256694 A1* | 11/2005 | Taylor | 703/22 |
| 2006/0074698 A1* | 4/2006 | Bishop et al. | 705/1 |
| 2006/0130053 A1* | 6/2006 | Buljore et al. | 717/173 |
| 2006/0253415 A1* | 11/2006 | Chakraborty et al. | 707/1 |
| 2008/0092149 A1* | 4/2008 | Rowbotham et al. | 719/321 |
| 2011/0039503 A1* | 2/2011 | Hu et al. | 455/74 |
| 2011/0053637 A1* | 3/2011 | Filipovic et al. | 455/552.1 |
| 2011/0190029 A1* | 8/2011 | Parssinen et al. | 455/552.1 |
| 2011/0296399 A1* | 12/2011 | Tugnawat et al. | 717/174 |

OTHER PUBLICATIONS

Notification of Transmittal of the International Search Report and the Written Opinion of the International Searching Authority, or the Declaration dated Oct. 16, 2007 in connection with PCT Patent Application No. PCT/2007/051407.

* cited by examiner

SOFTWARE DEFINED RADIO DEVICE AND CONFIGURATION METHOD OF THE SAME

CROSS-REFERENCE TO RELATED APPLICATION(S)

The present application claims priority under 35 U.S.C. §365 to International Patent Application No. PCT/IB2007/051407 filed Apr. 19, 2007, entitled "SOFTWARE DEFINED RADIO DEVICE AND CONFIGURATION METHOD OF THE SAME". International Patent Application No. PCT/IB2007/051407 claims priority under 35 U.S.C. §365 and/or 35 U.S.C. §119(a) to Chinese Patent Application No. 200610077447.4 filed Apr. 28, 2006 and which are incorporated herein by reference into the present disclosure as if fully set forth herein.

FIELD OF THE INVENTION

The present invention relates to a radio communication technique, and more particularly, to a SDR (software defined radio) device and its configuration method.

BACKGROUND OF THE INVENTION

With advances in modern microelectronics and microprocessor technologies, especially emergence of the LSI (Large Scale Integrated Circuit) and programmable logic devices, conventional radio technologies is based mainly on hardware have made great strides. Developments in hardware, such as DSP (Digital Signal Processor), FPGA (Field Programmable Gate Array) and GP (General-purpose Processor), and the introduction of the computer bus, lead to significant changes in the radio architecture and the birth of SWR (Software Radio) as a new technology. Since the software radio technology can be adapted to different standards by using different software and alters the channel access scheme or the modulation scheme by adjusting the software setting, flexible communication terminals can be developed so that a terminal may be used in mobile networks with different schemes, thus bringing convenience to the subscriber and decreasing cost for the operator, which prompts the development of mobile communication technologies.

The software radio, in its nature, refers to a radio platform with complete programmability and most flexibility. Complete programmability involves programmable RF (Radio Frequency) bands, channel access schemes and channel modulations. An optimum software radio should have the capability for RF digital access. The concept of software radio is introduced to implement the required radio system on an open common hardware platform by using different programmable software methods. Unfortunately, the requirement for complete programmability cannot be met yet under current technical conditions. SDR (Software Defined Radio) technology thus emerges, which refers to the software radio realizable under the current technical conditions and is considered as the software radio with IF (Intermediate Frequency) programmable digital access capability.

In a SDR terminal, the programmable hardware can perform different functions based on the respective configuration information. It is, therefore, a crucial technical issue in SDR as how to configure the terminal hardware. A configuration scheme for SDR is described in an U.S. application for patent with Publication No. 2005/0059427 A1, entitled "System and Method for Configuring a Software Radio" filed by Robert Leon Wallace on Sep. 15, 2003. In the scheme proposed in the patent application, a SDR device uses a programmable generic hardware platform, with all configuration information stored in a smart card. The configuration information includes various communication protocols, MODEM (Modulation and Demodulation) schemes, digital signal processing protocols, CODEC (Coding and Decoding) schemes and etc. The SDR device may configure the programmable hardware platform through reading the configuration information from the smart card to perform different functions, so as to configure the SDR device as a corresponding communication device as desired, for example, a CDMA (Code Division Multiple Access) mobile phone or a GSM (Global System for Mobile Communications) mobile phone. The scheme fully dependent on software to program the generic hardware is termed as complete software configuration scheme.

Although the above-mentioned complete software configuration scheme has great flexibility in theory, it's very hard to spread to business field in practical applications. Taking the most common programmable hardware FPGA as an example, it's expensive, as well as bulky and power-consumptive, which limits its use within research or military fields. Even without consideration of price and cost, it will still be very hard for FPGA to find applications in commercial mobile terminals, because its bulk and power consumption cannot meet the requirements of portability and limited battery capacity for mobile terminals. In addition, the configuration information will reach a large amount if all functions are embodied in the configuration information through software programming. When the configuration information is loaded into the SDR terminal device through reading the smart card or over-the-air download, there will be higher requirements for the memory capacity, card reading speed or download speed for the SDR terminal device.

From the above analysis of the full software configuration scheme, it can be seen that the complete software configuration scheme currently is only an ideal solution and has no feasibility due to some factors such as cost, power consumption and bulk.

SUMMARY OF THE INVENTION

An object of the invention is to provide a SDR device and its configuration method, which allows for configuration of the SDR device with open parameters. Accordingly, the SDR device can have certain configurability while being spread in business applications.

According to an embodiment of the invention, a method for configuring a software defined radio device comprises:

acquiring predefined configuration parameters related to a specific communication standard;

configuring a plurality of configurable generic software modules in the software defined radio device based on the configuration parameters, so that they comply with the communication standard corresponding to the configuration parameters; and performing instructions in the configured generic software modules by using a plurality of generic hardware modules in the software defined radio s device, to accomplish a corresponding function, so as to make the software defined radio device as a communication device complying with the communication standard.

According to an embodiment of the invention, a software defined radio device comprises:

at least one memory, for storing a plurality of configurable generic software modules to be configured based on predefined configuration parameters so that the plurality of configurable generic software modules are adapted to the communication standard corresponding to the configuration parameters; and a plurality of generic hardware modules, for performing instructions in the plurality of configured generic software modules, to accomplish a corresponding function, so as to make the software defined radio device as a communication device complying with the communication standard.

According to the SDR device and its configuration method in the invention, the SDR device uses generic hardware modules to operate configurable generic software modules so that the SDR device may be configured as desired by using open parameters of the generic software modules as the configuration parameters. The disadvantage of FPGA in the complete software configuration scheme is eliminated and the configuration parameters themselves take up a small data amount, which makes the SDR wireless communication terminals more economic and more flexible for configuration.

Other objects and attainments together with a fuller understanding of the invention will become apparent and appreciated by referring to the following descriptions and claims taken in conjunction with the accompanying drawings.

BRIEF DESCRIPTION OF THE DRAWINGS

Detailed descriptions will be made below to the invention with reference to the accompanying drawings and specific embodiments, wherein.

Throughout all the above drawings, like reference numerals will be understood to refer to like, similar or corresponding features or functions.

DETAILED DESCRIPTION OF THE INVENTION

To make the design of SDR terminals more flexible and efficient, a SDR wireless communication terminal is partitioned into a set of basic generic function modules. The partition is made in accordance with the functional definition of different parts in the SDR terminal, instead of the hardware entities. According to the invention, these generic function modules could be implemented by software running on a general-purpose processor (such as an ARM processor, or a DSP) or re-configurable hardware units (such as a Viterbi decoding co-processor). Such partition realizes a design of a highly flexible architecture for SDR terminal devices. Detailed descriptions will be made below to the invention with reference to the accompanying drawings.

Figure 1:
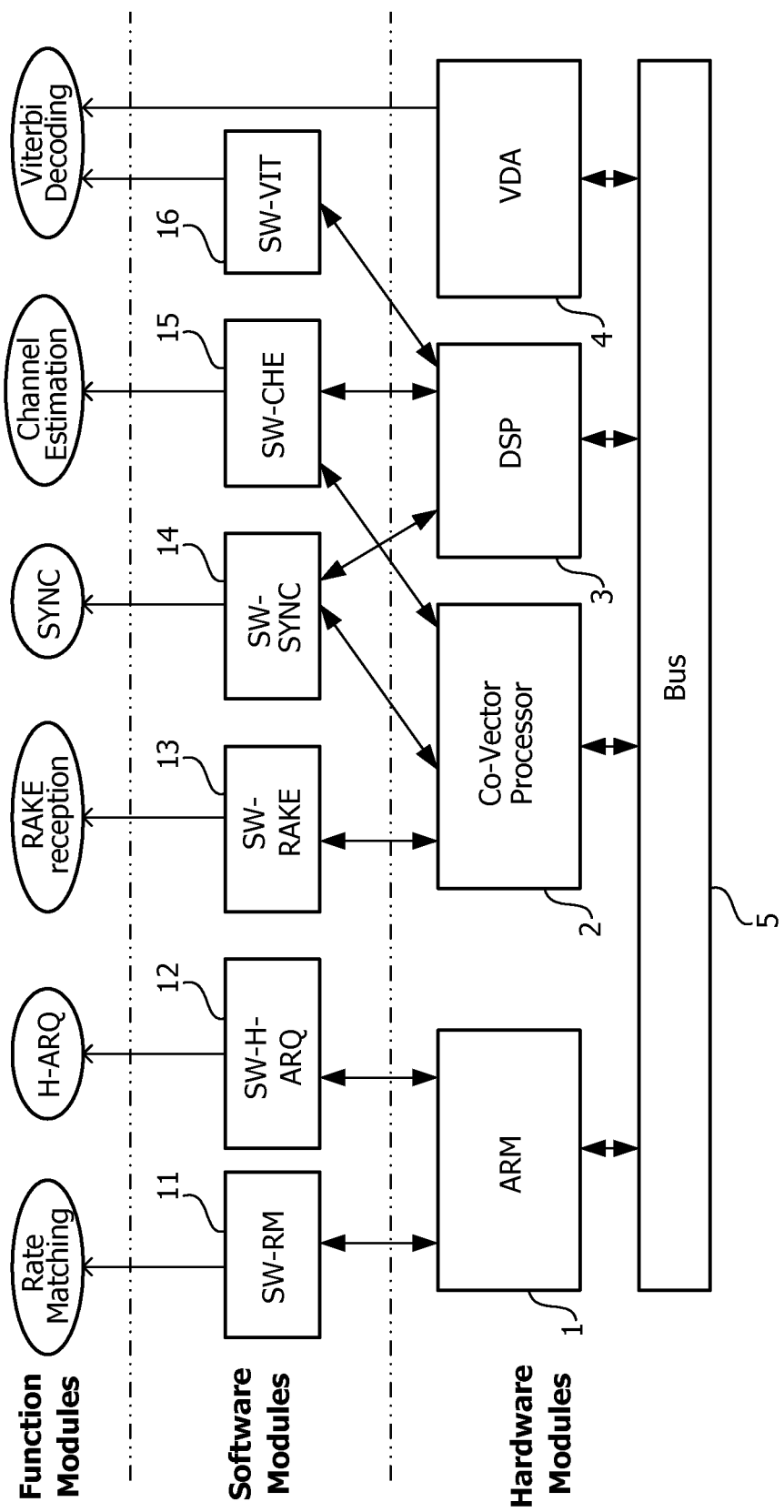
FIG. 1 is a block diagram illustrating a SDR wireless communication to terminal according to an embodiment of the invention.

FIG. 1 is a block diagram illustrating a SDR wireless communication terminal designed with the above partitioning according to an embodiment of the invention. For illustration, FIG. 1 shows only some, rather than all modules in the SDR wireless communication terminal.

Referring to FIG. 1, a SDR wireless communication terminal comprises software modules and hardware modules. The hardware modules mainly involve an ARM processor 1, a Co-Vector Processor 2, a DSP 3, a VDA (Viterbi Decoding Accelerator) 4 and a bus 5 for connecting them together. The software modules comprise a SW-RM (Software—Rate Matching) unit is 11, a SW-H-ARQ unit 12, a SW-RAKE reception unit 13, a SW-SYNC unit 14, a SW-CHE (Channel Estimation) unit 15 and a SW-VIT (Viterbi Decoding) unit 16. The generic function module may be implemented by combining hardware modules with the corresponding software modules. These function modules are the most basic parts for mobile terminals in various wireless communication systems to accomplish the same function. To accomplish a function for a mobile terminal in a particular wireless communication system, the hardware and software modules need to be further configured.

Both the hardware and software modules have certain configurability. With appropriate parameters, the corresponding hardware and software modules can be configured to obtain the desired function modules. For example, if the SDR wireless communication terminal is desired to have an appropriate rate-matching functionality, the SW-RM 11 and the ARM processor 1 will be configured so that the ARM can execute the instructions in the SW-RM 11 correctly, to obtain the rate-matching functionality.

Mobile terminals in different types of wireless communication systems might perform some identical function modules, which may be different only in some parameters. Therefore, the function modules, software modules and hardware modules in the above SDR wireless communication terminal can be suitable for one or more wireless communication system by configuring appropriate parameters.

For example, many wireless communication systems require the use of a convolutional coding algorithm and the corresponding Viterbi decoding algorithm. In FIG. 1, the Viterbi decoding function module is constructed on basis of a VDA (Viterbi Decoding Accelerator) 4 and a DSP 3 in combination with a particular SW-VIT 16. The Viterbi decoding function module capsulizes all common features for Viterbi decoding and just leaves a set of open parameters for adaptation to different communication standards, which may include the constraint length, generation polynomial, register transition state and etc.

The Viterbi decoding function module in FIG. 1 may be adapted to different wireless communication system based on the Viterbi decoding requirements in the respective wireless communication systems so long as corresponding configuration parameters are provided, so that the SDR wireless communication terminal in FIG. 1 may be configured as a communication terminal suitable for different wireless communication systems. For example, to adapt the SDR wireless communication terminal to the UMTS-FDD and TDD communication standards, the constraint length in the configuration parameters should be equal to 9, and G0=561 and G1=753 in the generation polynomial. If the SDR wireless communication terminal is to be adapted to the WLAN (Wireless Local Area Network) 802.11a communication standard, the constraint length in the configuration parameters should be equal to 7, and G0=133 and G1=171 in the generation polynomial.

The parameters for configuration of the generic function modules in the SDR wireless communication terminal may be stored in an external storage device, such as a SIM card or other storage cards, and fetched into the SDR wireless communication terminal for configuration, when necessary. Alternatively, the required configuration parameters may be obtained in other ways, such as downloaded over the network of the operator or upgraded by connecting to other devices via data lines.

Figure 2:
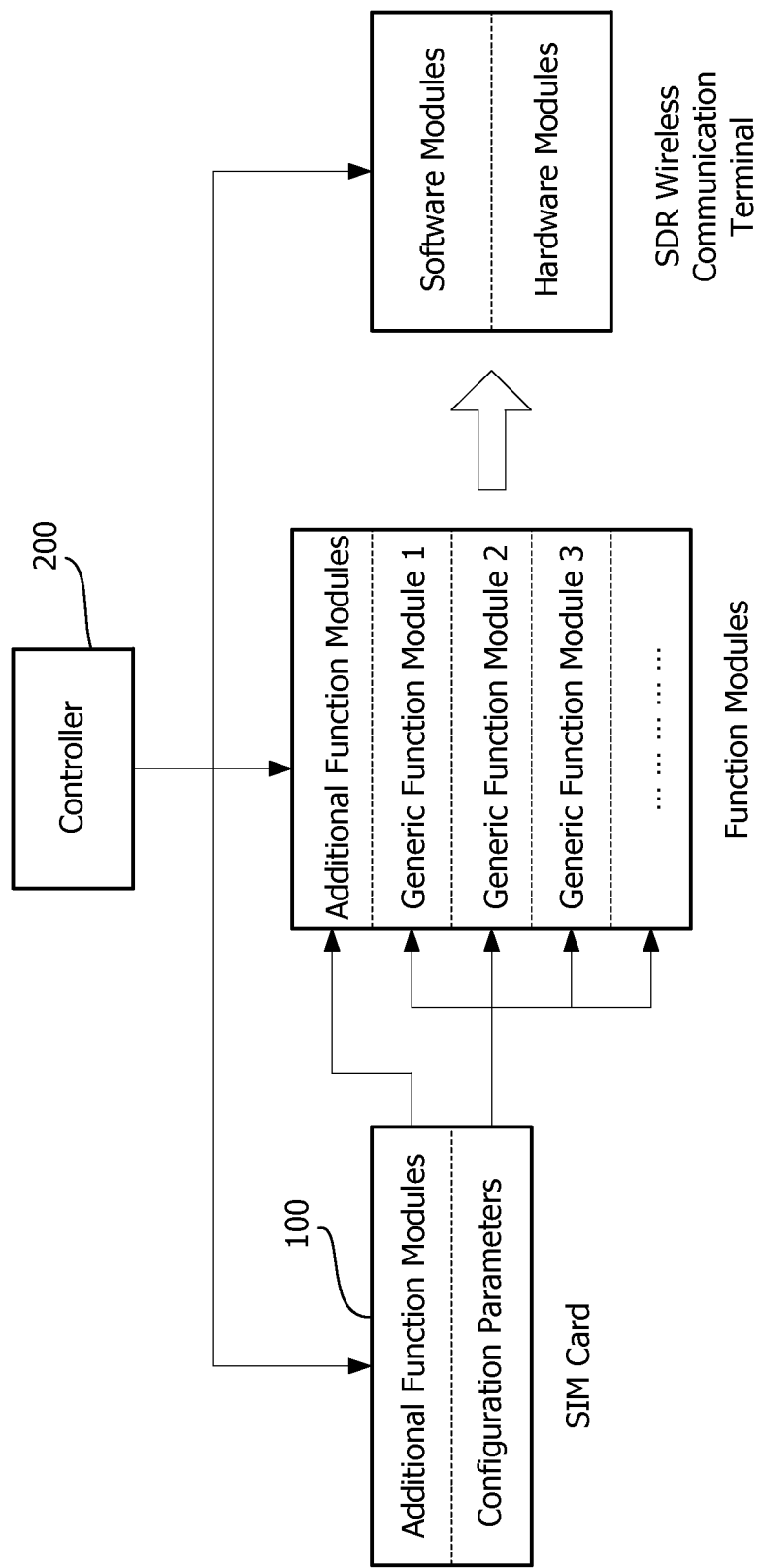
FIG. 2 is a diagram illustrating an architecture for configuring the SDR wireless communication terminal by using a SIM card according to the invention.

FIG. 2 schematically illustrates the architecture for configuring the SDR wireless communication terminal by using a SIM card according to the invention. In practical applications, all SDR wireless communication terminals may comprise some identical or similar generic hardware modules to and built-in software modules, which decreases the design complexity. For certain wireless communication systems, some special function modules are required, such as a CODEC scheme different from that for other wireless communication systems, or special application software, and etc. In this case, the service provider, or the operator in most situations, may load different additional function modules, along with the configuration parameters for the corresponding generic function modules into different SIM cards and provide them to appropriate subscribers, to provide different types of network services.

As shown in FIG. 2, after a subscriber inserts a SIM card 100 into a SDR wireless communication terminal, the SDR wireless communication terminal will read the additional function modules and the configuration parameter data for the generic function modules and integrates them into its function module portion to accomplish the configuration. The whole configuration process is performed under the control of a controller 200, which may be a baseband processor in the SDR wireless communication terminal, such as a DSP or an ARM processor.

Figure 3:
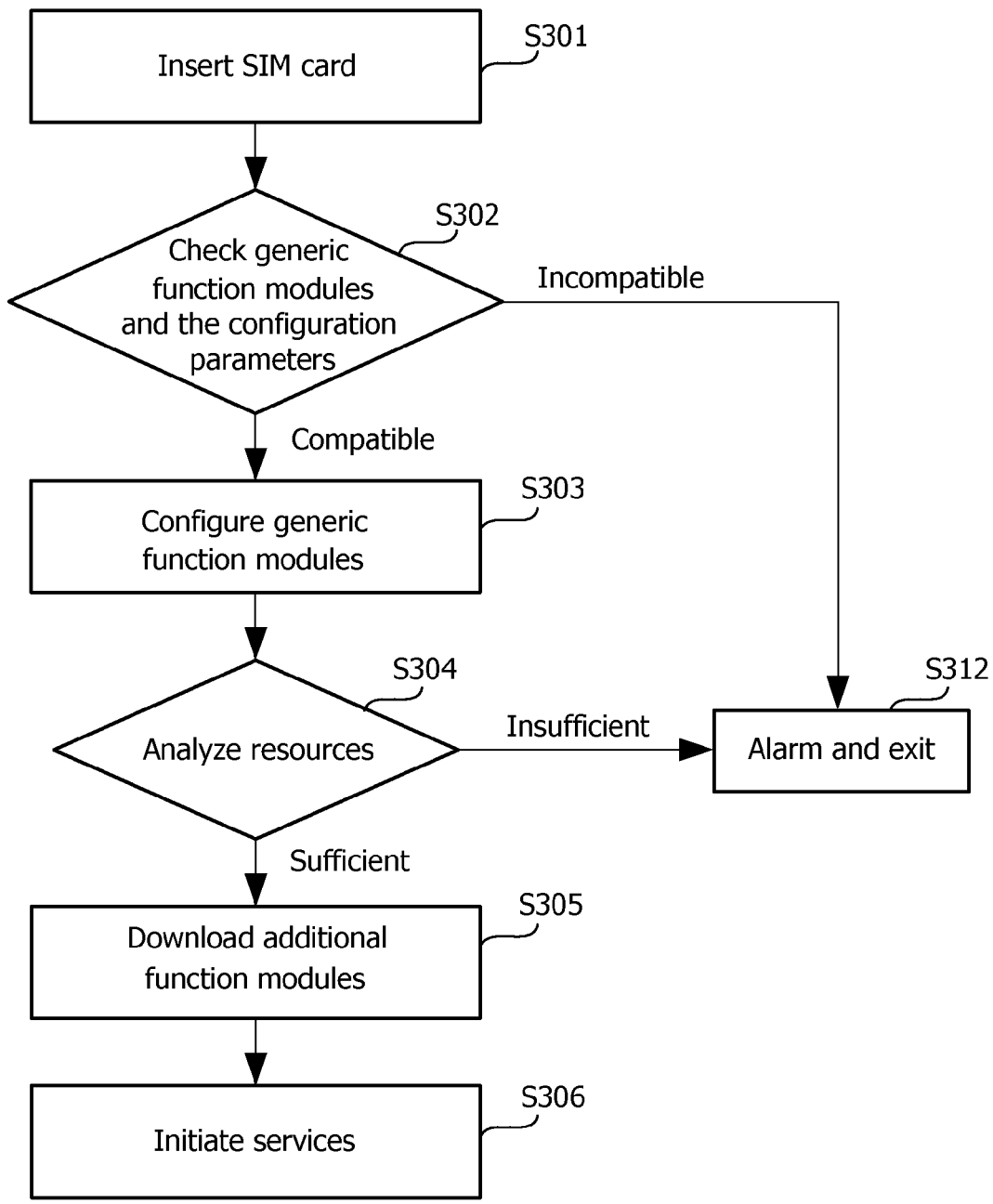
FIG. 3 is a flow chart illustrating the method for configuring the SDR is wireless communication terminal by using the SIM card according to the invention.

FIG. 3 is a flowchart illustrating a method for configuring the SDR wireless communication terminal by using the SIM card according to an embodiment of the invention. Upon detection that the subscriber inserts a SIM card (step S301), the SDR wireless communication terminal will determine whether the generic function modules inside are compatible with the configuration parameters read from the inserted SIM card (step S302). If no, the SDR wireless communication terminal will issue an alarm and exit from the current operation (step S312); if yes, the SDR wireless communication terminal configures the generic function modules inside by using the configuration parameters read from the inserted SIM card (step S303). After the configuration is done at step S303, the SDR wireless communication terminal analyzes whether the remaining hardware/software resources are sufficient to perform the additional function modules in the SIM card (step S304). If the resources are not sufficient, the SDR wireless communication terminal will issue an alarm and exit from the current operation (step S312); if the resources are sufficient, the additional function modules in the SIM card will be downloaded into the SDR wireless communication terminal (step S305), and then the SDR wireless communication terminal may accomplish the configuration and enable the corresponding network services provided from the operator (step S306). If no additional function modules are included in the SIM card, the SDR wireless communication terminal may perform the configuration at step S306 directly by skipping steps S304, S305 and S314.

In comparison with prior arts, the SDR wireless communication terminal of the present invention comprises basic generic hardware modules, such as DSP and ARM, and configurable generic software modules, so it may be configured as a specific wireless communication terminal. In most cases, this may be done by only providing appropriate parameters. The disadvantage of FPGA in the complete software configuration is eliminated and the configuration parameters themselves take up a small data amount, which makes the SDR wireless communication terminals more practical and more flexible for configuration.

Moreover, the SDR wireless communication terminal of the present invention may be easily configured as a dual-mode or multi-mode wireless communication terminal because it already comprises the most basic generic hardware/software modules and function modules.

Figure 4:
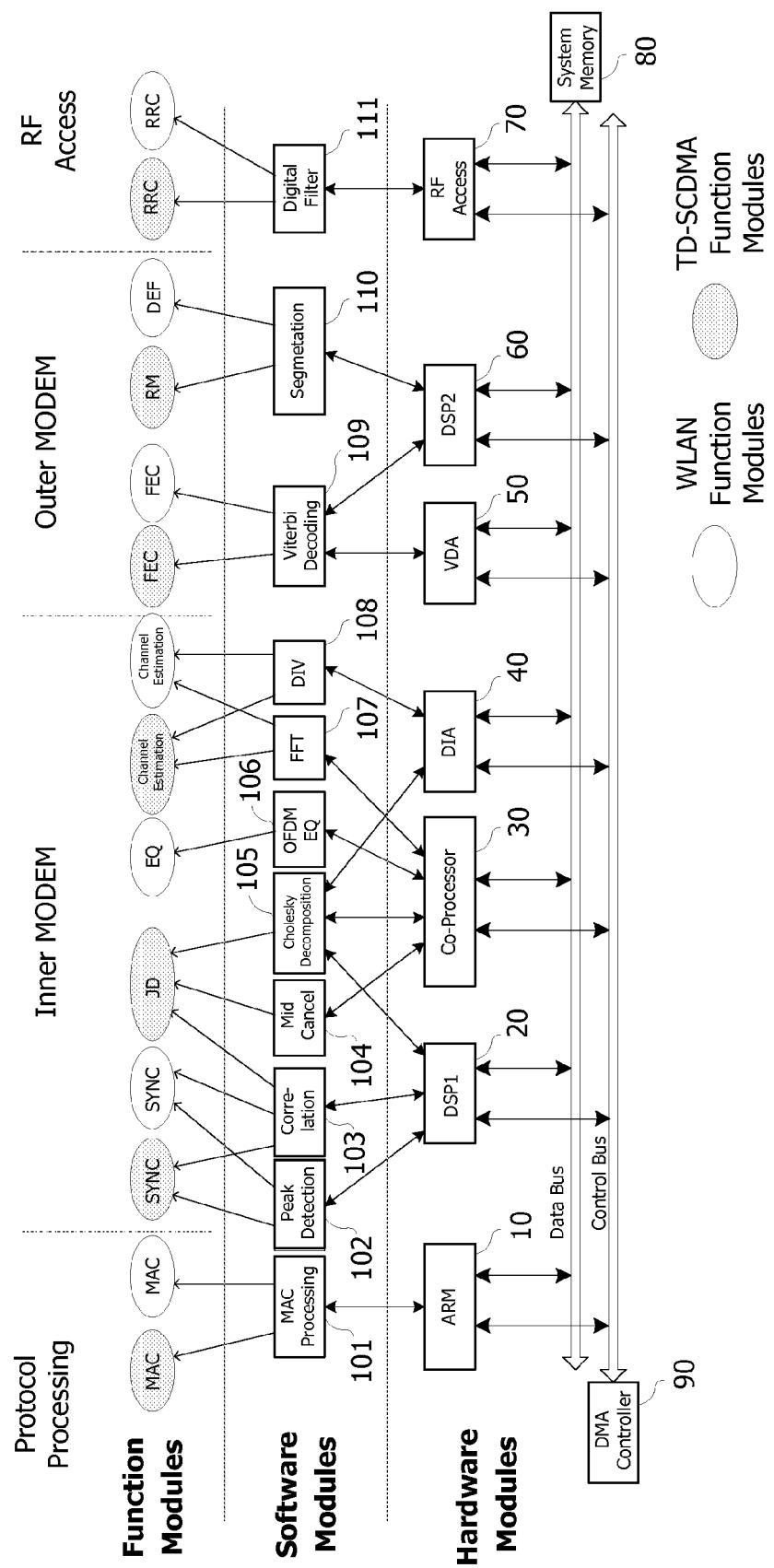
FIG. 4 is a block diagram illustrating a dual-mode wireless communication terminal incorporating TD-SCDMA and WLAN features designed according to the SDR wireless communication terminal architecture of the invention.

FIG. 4 is a block diagram illustrating a dual-mode wireless communication terminal incorporating TD-SCDMA and WLAN features designed according to the SDR wireless communication terminal architecture in an embodiment of the invention. The hardware modules of the dual-mode wireless communication terminal mainly comprise an ARM processor 10, a first DSP 20 (DSP 1), a co-processor 30, a DIA (Division Accelerator) 40, a VDA 50, a second DSP 60 (DSP 2), a RF access unit 70, a system memory 80, a DMA controller 90 and a data bus and a control bus for connecting them together. The software modules of the dual-mode wireless communication terminal mainly comprise a MAC processing unit 101, a peak detection unit 102, a correlation unit 103, a Mid Cancel unit 104, a Cholesky decomposition unit 105, an OFDM EQ unit 106, a FFT unit 107, a DIV unit 108, a Viterbi decoding unit 109, a segmentation unit 110 and a digital filtering unit 111. These software modules may be pre-stored in the system memory 80 and invoked by the hardware modules.

The function modules for TD-SCDMA and WLAN systems in the dual-mode wireless communication terminal may be classified as four functional portions for protocol processing, inner MODEM (modulation and demodulation), outer MODEM and RF access, each portion comprising different function modules. The shadowed function modules are for TD-SCDMA systems, and the other function modules are for WLAN systems. The two communication modes might use some similar function modules, for example, the FEC (Forward Error Correction) function module and the RRC (Root Raise Cosine) filter function module are used in both TD-SCDMA and WLAN systems. Some function modules are unique to a system, for example, the JD (Joint Detection) function module is only used for the TD-SCDMA system and the EQ module only for the WLAN system.

All function modules are mapped to the corresponding software modules and hardware modules, and some software modules can separately act as a specific function module in different communication modes after configuration, such as the Viterbi decoding unit 109 and the digital filtering unit 111. Some software modules pertain to general-purpose signal processing units, and may be combined with other software modules to implement different function modules, such as the correlation unit 103.

In the embodiment of FIG. 4, all software modules are run on hardware processors, such as the ARM, DSP and co-processor, which are mature and thus inexpensive relatively. The SDR wireless communication terminal of the present invention is more economic and flexible in applications since it can be configured as a dual-mode wireless communication terminal.

It is to be understood by those skilled in the art that various improvements and modifications may be made to the SDR wireless communication terminal and its configuration method as disclosed in the present invention without departing from the basis of the present invention, the scope of which is to be defined by the appended claims herein.

The invention claimed is:

1. A method for configuring a software defined radio device, comprising:

in response to insertion of a Subscriber Identity Module (SIM) card into the software defined radio device, performing:

acquiring from the SIM card predefined configuration parameters related to a specific communication standard;

configuring a plurality of individually-configurable generic software modules in the software defined radio device based on the configuration parameters, so that the plurality of individually-configurable generic software modules comply with the communication standard corresponding to the configuration parameters;

following said configuring of the plurality of individually-configurable generic software modules, analyzing whether remaining hardware/software resources in the software defined radio device are sufficient to perform additional function modules stored in the SIM card, wherein the additional function modules include processor executable instructions;

in response to the remaining hardware/software resources in the software defined radio device being sufficient to perform the additional function modules stored in the SIM card, then acquiring the additional function modules from the SIM card;

performing instructions in the individually-configurable generic software modules and in the additional function modules by using a plurality of generic hardware modules in the software defined radio device, to accomplish a corresponding function, so as to make the software defined radio device as a communication device complying with the communication standard.

2. The method of claim 1, wherein the plurality of generic hardware modules at least comprise a digital signal processor and a general-purpose processor.

3. A software defined radio device, comprising:
a Subscriber Information Module (SIM) card reader;
at least one memory, for storing a plurality of individually-configurable generic software modules to be configured based on predefined configuration parameters, so that the plurality of individually-configurable generic software modules are adapted to the communication standard corresponding to the configuration parameters;
the plurality of individually-configurable generic software modules stored in said at least one memory;
a controller that responds to insertion of a SIM card into the SIM card reader by causing:
    acquiring from the SIM card the predefined configuration parameters related to the communication standard;
    configuring the plurality of individually-configurable generic software modules stored in said at least one memory based on the configuration parameters;
    following said configuring of the plurality of individually-configurable generic software modules, analyzing whether remaining hardware/software resources in the software defined radio device are sufficient to perform additional function modules stored in the SIM card, wherein the additional function modules include processor executable instructions;
    in response to the remaining hardware/software resources in the software defined radio device being sufficient to perform the additional function modules stored in the SIM card, then acquiring the additional function modules from the SIM card; and
a plurality of generic hardware modules, for performing instructions in the plurality of individually-configurable generic software modules and in the additional function modules, to accomplish a corresponding function, so as to make the software defined radio device as a communication device complying with the communication standard.

4. The software defined radio device of claim 3, wherein the plurality of generic hardware modules at least comprise one of a digital signal processor and a general-purpose processor.

* * * * *

UNITED STATES PATENT AND TRADEMARK OFFICE
CERTIFICATE OF CORRECTION

PATENT NO. : 9,088,341 B2
APPLICATION NO. : 12/226647
DATED : July 21, 2015
INVENTOR(S) : Hu et al.

Page 1 of 1

It is certified that error appears in the above-identified patent and that said Letters Patent is hereby corrected as shown below:

In the Specification

In Column 1, Line 29, delete "is based" and insert -- based --, therefor.

In Column 2, Line 59, delete "s device," and insert -- device, --, therefor.

In Column 3, Line 30, delete "to terminal" and insert -- terminal --, therefor.

In Column 3, Line 36, delete "is wireless" and insert -- wireless --, therefor.

In Column 4, Line 5, delete "is 11," and insert -- 11, --, therefor.

In Column 5, Line 8, delete "to and" and insert -- and --, therefor.

In the Claims

In Column 7, Line 39, in Claim 2, delete "comprise" and insert -- comprise one of --, therefor.

Signed and Sealed this
Twelfth Day of April, 2016

Michelle K. Lee
*Director of the United States Patent and Trademark Office*